United States Patent [19]
Kelch

[11] 3,931,508
[45] *Jan. 6, 1976

[54] ARRANGEMENT FOR FURNISHING AN INDICATION OF TOTAL FARE INCLUDING SURCHARGES IN AN ELECTRONIC TAXIMETER

[75] Inventor: Heinz Kelch, Buchenberg, Germany

[73] Assignee: Kienzle Apparate GmbH, Villigen, Black Forest, Germany

[ * ] Notice: The portion of the term of this patent subsequent to Oct. 22, 1991, has been disclaimed.

[22] Filed: Mar. 22, 1974

[21] Appl. No.: 454,238

[30] Foreign Application Priority Data
Mar. 24, 1973 Germany............................ 2314737

[52] U.S. Cl................................ 235/168; 235/30 R
[51] Int. Cl.²......................................... G07B 13/04
[58] Field of Search ....... 235/168, 30 R, 33, 92 TC, 235/92 CP, 45

[56] References Cited
UNITED STATES PATENTS
3,764,782 10/1973 Spauszus et al. ............... 235/92 TC
3,818,186 6/1974 Harwood........................... 235/30 R

*Primary Examiner*—David H. Malzahn
*Attorney, Agent, or Firm*—Michael S. Striker

[57] ABSTRACT

An electronic taximeter for fare computation is supplemented in such manner as to be able to add any additional charges or surcharges to the normal fare upon actuation of a predetermined input means the result of such addition being indicated as a sum on the electronic indicating means. Upon release of the input means or upon actuation of other input means this sum is decomposed by subtraction to the original amounts of the normal fare and the surcharges. The input means may be the key provided for switching off the waiting time charge at the end of a trip or it may be a special key for this purpose.

5 Claims, 3 Drawing Figures

ARRANGEMENT FOR FURNISHING AN INDICATION OF TOTAL FARE INCLUDING SURCHARGES IN AN ELECTRONIC TAXIMETER

CROSS-REFERENCE TO RELATED APPLICATIONS

The improvement in this application relates to an electronic taximeter disclosed in copending application Ser. Nos. 323,907, now Pat. No. 3,860,807, and 323,908, now Pat. No. 3,860,806, respectively filed Jan. 19, 1973 and Jan. 19, 1973, and respectively entitled ELECTRONIC TAXIMETER HAVING SERIALLY ENERGIZED INDICATOR MEANS and ELECTRONIC TAXIMETER HAVING INTERCHANGEABLE CONSTANT FURNISHING MEANS.

BACKGROUND OF THE INVENTION

The present invention relates to an electronic taximeter. In particular it relates to an electronic taximeter which has input means activated by the driver for generating function control signals. The meter further comprises control means connected to the input means for furnishing control signals corresponding to the so-furnished function signal. Storage means having first storage location for storing data for computing the fare based on distance travelled and waiting time, second storage locations for storing the so-computed fare, and third storage locations for storing data representing additional charges. The electronic taximeter further has computer means responsive to said control signals for computing the fare from data in said storage means. Finally the electronic meter has indicator means having a plurality of indicator positions, each connectable to a corresponding one of said storage locations in said storage means under control of said control signals, for furnishing a visual indication of the data stored in said corresponding ones of said storage locations. The above-described taximeter is an electronic meter which already represents a great advance over the standard mechanical taximeters. The latter, as commercially available today, generally have two indicators, one for indicating the fare resulting from distance travelled and waiting time and the other for indicating additional charges or surcharges (it should be noted that the latter two expressions are used interchangeably in this application). The cylinders in the first indicator operate continuously during the trip while the second indicator may be activated by activation of a key which is coupled to either mechanical or electromechanical linkages. At the end of the trip the passenger must of course pay the sum of the two indicated amounts. The additional charges of course are fixed either by the local authorities in the tariff regulations. These additional charges may for example include a fixed charge per suitcase or a fixed charge for additional persons being carried by the cab over and above a given number of passengers. Unfortunately the taxi driver often has difficulties to convince the customer who may not be familiar with all the regulations that it is true that the price he has to pay is not only the above-mentioned fare based on waiting time and distance travelled but also the sum of the various additional charges. Further the actual carrying out of the addition may lead to some difficulty.

SUMMARY OF THE INVENTION

It is an object of the present invention to prevent the above-mentioned arguments between passenger and driver by allowing the driver to furnish an indication of the total price including the additional charges to the passenger. This also of course eliminates the necessity for having the driver carry out the addition on paper or in his head which of course can lead to errors and further disputes.

The present invention resides in a taximeter as described under the background of the invention and comprises switch means in said input means for furnishing a total fare signal upon external activation. It further comprises control circuit means in said control means for furnishing a computer control signal in response to said total fare signal for controlling said computer means to add said fare stored in said second storage locations to said data stored in said third storage locations, furnish a corresponding sum signal, and transfer said sum signal to said corresponding ones of said storage locations connectable to said indicator locations, whereby visual indication of said sum signal may be furnished.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
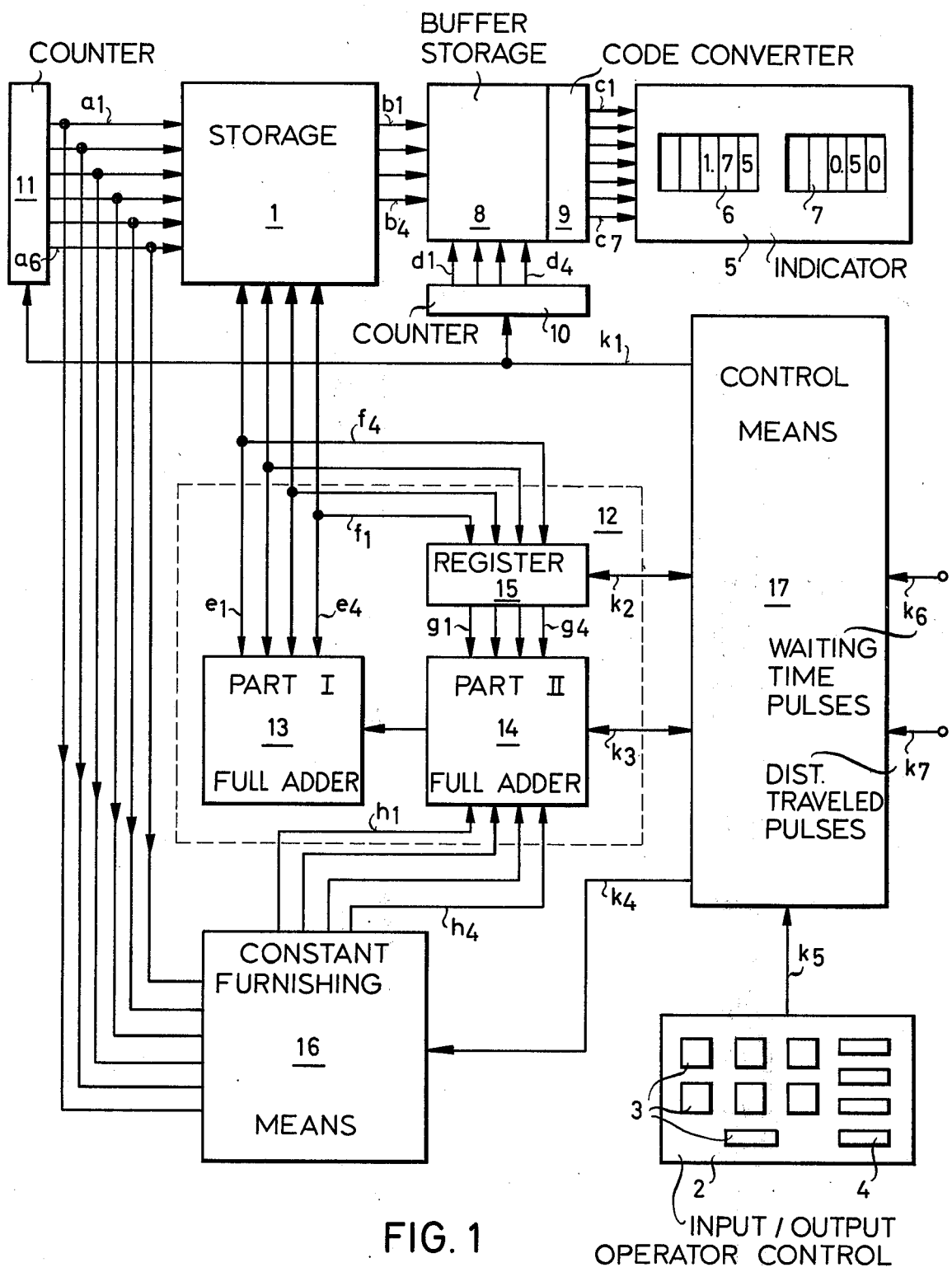
FIG. 1 shows the taximeter in block diagram form.

A preferred embodiment of the present invention will now be described with reference to the drawing.

First, the taximeter pictured in block diagram form in FIG. 1 will be discussed. As shown in FIG. 1, the taximeter comprises a storage means 1 which are a matrix storage having sufficient storage locations as are required to calculate the fare based on distance travelled and waiting time during the trip and further to form other totals as may be required as for example the sum of all the prices charged for individual trips, the number of trips, the actual distance travelled, the sum of the distances travelled with a passenger in the cab, the sum of the various additional and surcharges, etc. Specifically, this storage means has first storage locations, generally five storage locations wherein the fare is continually stored. It should be noted here that the term "storage locations" as used in this application does not necessarily imply only a single bit. A storage location encompasses as many bits as are required to represent a particular digit.

The input means of the taximeter have reference numeral 2. They comprise a plurality of keys 3 which serve to control the input operations and a further plurality of keys 4, which controls the output operations. Keys 3 will comprise keys which indicate an empty taxi, keys for a plurality of rates applicable during the drive and during waiting time, further keys which indicate that the trip is finished and the final computations are to take place and still a further key for allowing the entry of surcharges. The keys 4, as mentioned above, control the output operations, that is they may, upon activation, furnish at the indicator a signal corresponding to the sum of the distance travelled during the day, the number of trips the taxi driver has made, the total of the surcharge over all the trips, etc. Keys 3 and 4 may of course be replaced by rotary switches having as many positions as there are keys. The indicator means are indicated by reference numeral 5 and comprise a first portion 6 and a second portion 7. The portion 6 which, in the embodiment shown in the Figure, has five places serves to indicate the fare based on distance travelled and waiting time which of course changes continually during a trip. Portion 7 of the indicator serves to indicate the surcharges while the taxi is in operation transporting passengers and, when the taximeter is not so employed may serve to indicate the various quantities called out by the operation of the above-mentioned keys 4.

The indicator, as discussed in great detail in the co-pending applications referenced above, is an electronic indicator which furnishes the indications by a sequential energization of each individual indicating element, these individual indicating elements each comprising seven segments which are selectively energizable to form the various numbers. Since the energization of the indicator elements takes place cyclically at a sufficiently rapid speed, visual persistance causes the indication to seem to be continuous. However, since the indication is such a cyclical indication, it is of course necessary that the values to be indicated are continually available. Thus a buffer storage 8 is provided which stores only those numbers which are to be indicated. Buffer storage 8 is connected to the indicator via lines c1-c7 and is connected to the storage 1 through lines $b_1-b_4$. Of course the number of storage locations in storage 8 is much less than that in storage 1 since, as mentioned above, only those values which are to be furnished to the indicator are stored therein. Buffer storage 8 contains the second and third storage locations as set forth in the claims, and of course the "corresponding storage locations" set forth in the claims. Storage 1 also contains storage locations storing the same values as are stored in buffer storage 8 and further of course also contains the first storage locations which store the data required for computing the fare. The number of storage locations in buffer storage 8 corresponds to the number of indicator elements in indicator 5. As shown, buffer storage 8 will have ten storage locations. A decoding arrangement 9 is arranged between buffer storage 8 and the indicator 6 in order to convert the four-bit binary representation in each location in buffer storage 8 to the seven-bit representation required to energize the indicator elements. A counter 10 which forms part of the control means serves to address the buffer storage locations 8 in a determined sequence so that the above-mentioned seemingly continuous indication on indicator 5 results.

The control means further comprise a counter 11 for cyclically addressing the storage locations in storage 1. This of course has to have sufficient capacity to address 40 to 50 locations through the fixed address lines $a_1-a_6$. Further, a computer 12 cooperates with storage 1. This computer 12 contains the two parts 13 and 14 of a parallel full adder also discussed in detail in the above-references applications and a register 15 which in a preferred embodiment, is a four-bit flip-flop register. It should further be noted that adder 13-14 will add upon receipt of an "add" signal and will subtract the value stored in part 14 from that in part 13 upon receipt of a "subtract" signal. Storage 1 is connected to the portion 13 of the full adder through lines $e_1-e_4$ in such a way that the four bits of a particular storage location are transferred in parallel to part 13 of the adder. Lines $e_1-e_4$ are also connected to lines $f_1-f_4$ which form the input to the above-mentioned register 15. The output of register 15 is connected to part 14 of this full adder through lines $g_1-g_4$. Part 14 of the full adder is also connected through lines $h_1-h_4$ to constant furnishing means 16.

The constant furnishing means 16 which are also described in detail in the above-referenced applications are, in a preferred embodiment, a commercially available storage into which fixed values may be wired or otherwise entered. Lines $a_1-a_6$ which serve to address locations in storage 1 also serve to address corresponding locations in the constant furnishing means 16. Any so addressed storage location in constant furnishing means 16 furnishes a four-bit binary output signal on lines $h_1-h_4$ to part 14 of the full adder.

The taximeter further comprises a central control means 17 which is connected to counter 11 and counter 10 via a line $k_1$. It is further connected to register 15 through a line $k_2$ and to part 14 of the full adder through a line $k_3$. Its connection with the constant furnishing means 16 is indicated by a line $k_4$. It should be noted that all of these lines are symbolic connections taking the place of what is in the most part, a plurality of lines.

Control means 17 are a complicated logic network which comprises input registers for the waiting time pulses and distance travel pulses. These are furnished on lines $k_6$ and $k_7$. Further, the clock synchronizing all the operations of the taximeter is also contained therein. Specifically, the clock furnishes the signals which advance counters 10 and 11 in cyclical fashion. The count on the counters of course determines the read-out of storage 1 and storage 8 and the indication on the indicator 5. Of course the storage location addressed in storage 1 also controls what is added in adder 13-14 and what constants are furnished by the constant furnishing means 16. It should be noted that the signals supplied from the input means 2 which are applied to the control means are furnished on a line $k_5$ (actually of course a plurality of lines) and are herein referred to as the function signals. The signals on lines $k_1-k_4$ are herein referred to as the control signals.

The function of the taximeter will now be described in general terms before the present invention is discussed in detail. The waiting time pulses and distance travel pulses are, as mentioned above, furnished on lines $k_6$ and $k_7$ to control means 17. First these are stored separately under control of one of the keys of the input means, for example a key 3 which signifies a first fare rate. The activation of the key for "fare rate 1" causes a corresponding signal to be stored in control means 17, which in turn initiates a determined sequence of functions at determined times within the cycle for storage 1. Thus, in correspondence to a constant stored in constant furnishing means 6 which corresponds to "fare rate 1" the number of incoming distance travelled pulses is divided by the constant furnished by constant furnishing means 16, that is only one pulse is counted for a predetermined number of pulses ariving on line $k_7$.

Previously, at the start of the trip, the flag-down fare is entered into the second storage locations, for example storage locations 1–5. This value, which may for example be 85 cents, is also transferred through buffer storage 8 to indicator 6. Further, if the passenger has, for example, also brought a suitcase, that key 3 which corresponds to the surcharge is activated by the driver and the constant furnishing means are addressed causing the correct data to be entered into the third storage locations, for example, locations 6–10 in storage 1. There are also transferred through buffer storage 8 and code converter 9 to the indicator, and more specifically to the indicator portions 7. During the trip of course the waiting time pulses and distance travelled pulses are both counted, reduced by the factor corresponding to the fare rate, and then are used to advance the data in storage locations 1–5 after a number of pulses corresponding to the flag-down fare has been received. The value in storage location 1, and thus the indicated value, is advanced whenever a predetermined number of pulses corresponding to the particular fare rate being used has been received. For example the price will advance by a particular fare increment such as for example 35 cents after a given number of pulses, either waiting time or distance travelled, has been received. The final fare value based on distance travelled and waiting time, is always stored in locations 1–5.

Of course adder 13–14 serves to add to the values stored in storage 1 in dependence upon the value furnished by constant furnishing means 16 and in dependence upon the incoming pulses on lines $k_6$ and $k_7$. Specifically, the data stored in one particular location in storage 1 is first transferred to part 13 of the adder while the values of the constant furnished by the constant furnishing means is stored in part 14. However, the detailed operation of the adder is not a part of the present invention and will not be discussed here in detail. Further information can be obtained in the above-identified copending applications.

For explanation of the invention it must now be remembered that the second storage locations in storage 1 (assume locations 1–5) carry the fare based on waiting time and distance travelled which is being indicated in portion 6 of indicator 5. Further, the third storage locations (6–10) carry the data which signifies the total surcharge. This of course is simultaneously shown on indicator 7. It must further be kept in mind that one of the keys 3 is the key which is activated by the driver at the end of the trip in order to indicate the final fare and the value of the surcharge to the passenger. However in accordance with the present invention, the activation of this key also furnishes a function signal, herein referred to as a total tarif signal to control means 17. This causes the control means to initiate an addition of the value stored in locations 1–5 to that stored in locations 6–10. Of course the key which causes the generation of the total tarif signal need not necessarily be the above-mentioned key but may be a special key for this purpose. The key is shown as key 20 in FIG. 2a and will be discussed in greater detail in relationship to FIGS. 2a and 2b. Simultaneously, a control signal is furnished which activates register 15 which comprises four flip-flops. During the first cyclic activation of storage 1, the data stored in storage location 1 is transferred both to part 13 of the full adder and to register 15. The portions stored in part 13 of the adder is retransferred into storage location 1 of the storage 1, while the same signal stored in register 15 remains therein. It should be noted that storage location 1 stores the value of the lowest place in the fare, while the highest place value is stored in location 5. Thereafter of course locations 2–5 are sequentially addressed, transferred to part 13 of adder 13–14 and retransferred into storage 1. The value stored in register 5 remains without change. However, when storage location 6 is interrogated, that is when the lowest place value of the surcharge is addressed, then a transfer takes place simultaneously from register 15 to part 14 of the adder. Thus at this point the lowest place value of the surcharge is stored in part 13 while the lowest place value of the fare based on waiting time and distance travelled is stored in part 14. An addition takes place and the sum signal is retransferred to storage locations 6. Next, locations 7–10 are addressed in sequence. The values are transferred into part 13 of the full adder and retransferred back into the original storage location without any computation being carried out. The remaining storage locations in storage 1 are also addressed without any action except the restoring of the originally stored values back into the storage positions. However, during the next cycle, the value stored in storage location 2 is transferred both into part 13 of the adder and into register 15. When the location 7 of the surcharges is interrogated, an addition again takes place and the second sum signal namely for the secondly significant place is transferred back into position 7. After five complete cycles, the total price for the trip, that is the sum of the fare based on waiting time and distance travelled and the surcharges, is stored in locations 6–10. The value of the fare alone, based on waiting time and distance travelled, is of course still stored in locations 1–5.

Since locations 6–10 in storage 1 are always cyclically connectable to indicator connections 7 through buffer storage 8 and decoder 9, at the end of the above-mentioned cycles the total price for the trip will be indicated in indicator part 7. It is of course equally possible to control the system so that the indication takes place in indicator part 6.

Under some conditions it may be desirable that the full price again be split up into the value of the fare based on distance and waiting time and the surcharge. This may particularly be the case if a dispute arises between the driver and the passenger regarding an individual item as for example part of the surcharge. In this case the arrangement may operate so that activation of the key causes the addition which furnishes the total price and causes this total price to be exhibited in one part of indicator 5, while activation of another key causes the value stored in the other part of the indicator to be subtracted from this total price. This causes the fare again to be indicated in indicator 6 and the surcharges to appear separately in indicator portion 7. In a further preferred embodiment of the present invention the addition is carried out under control of the activation of a key, while the subtraction takes place when the key is no longer pressed down by the driver.

Figure 2A:
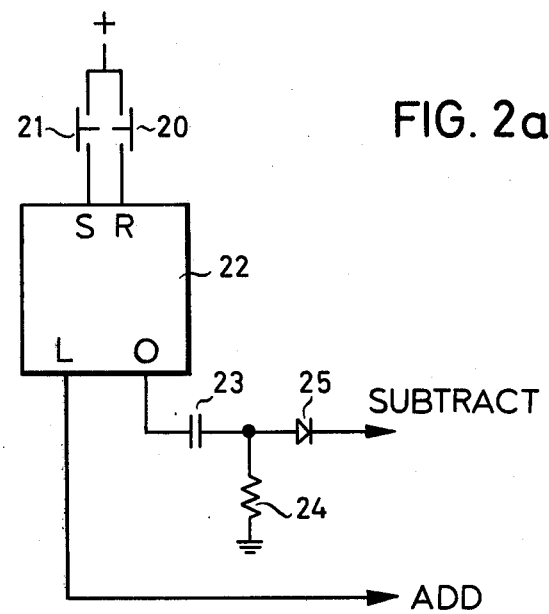
FIGS. 2a and 2b are circuit diagrams of the input and control means added for the present invention.

This will be described in greater detail with reference to FIGS. 2a and 2b. Shown in FIG. 2a are two keys labelled 20 and 21. A depression of key 20 causes a positive signal to be applied to the reset input of a flip-flop 22 while depression of key 21 causes a signal to be applied to the set input of flip-flop 22. When flip-flop 22 is set, the output signal is the signal which controls adder 13–14 to add. Since the subtract signal should not be furnished whenever flip-flop 22 is reset, but only when it goes from the set to the reset state, a differentiating circuit including a capacitor 23 and a resistor 24 is furnished as is a diode 25 which suppresses the negative going pulses generated when the flip-flop changes from a reset to a set state. The signal furnished at the output of diode 25 is the subtract signal. In response to the subtract signal the same process takes place as was described for the addition of the data in locations 1–5 to that in the locations of 6–10, but now the value stored in storage locations 1–5 is subtracted from that stored in storage locations 6–10, that is the fare based on waiting time and distance travelled is subtracted from the total price. The resulting difference signal which is the signal representing the surcharges is transferred back into storage positions 6–10 for indication on indicator portion 7. At the end of the subtraction process the fare based on waiting time and distance travelled is again indicated in indicator portion 6 while the surcharges are indicated in indicator portion 7.

Figure 2B:
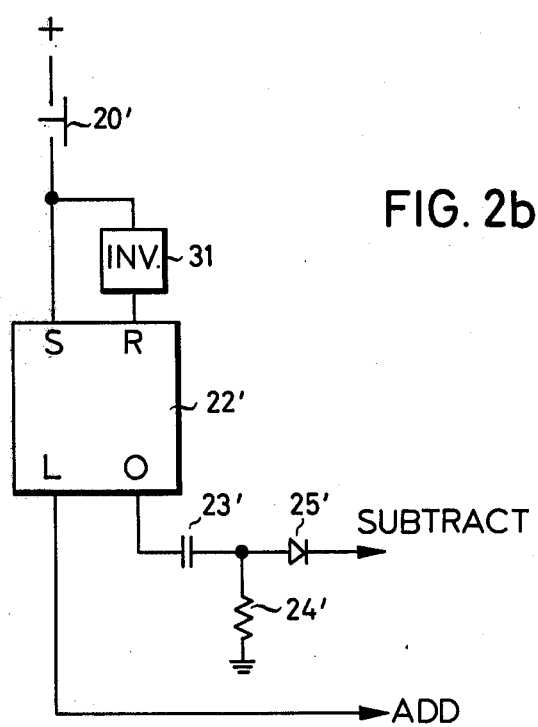

An alternate embodiment of the circuit of FIG. 2a is shown in FIG. 2b. Here keys 20, 21 are replaced by a single key 20'. The signal furnished by key 20' when depressed is directly applied to the set input of a flip-flop 22' and is applied to the input of an inverter 31 whose output energizes the reset input of flip-flop 22'. The remainder of the circuit is identical to that shown in FIG. 2a and operates in the same fashion. It should be noted that there is some advantage of the circuit of FIG. 2b relative to that of FIG. 2a in that the flip-flop will automatically return to the reset state when the button 20' is no longer pressed down. This of course is desirable since the subtract signal is furnished only during the transition and the flip-flop, when in the reset state otherwise does not interfer with the remaining control circuitry.

Of course it is also possible that one forgets about indicating the surcharges as such during the trip. Under these conditions the value of the surcharges are entered into storage 1 upon activation of the corresponding keys 3. Upon depression of a key such as key 20', the surcharge value is added to the fare and the resulting sum signal is applied to a single indicator.

While the invention has been illustrated and described as embodied in specific circuits for furnishing the "subtract" and "add" signals, it is not intended to be limited to the details shown, since various structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an electronic taximeter having input means for furnishing function signals under external activation, control means connected to said input means for furnishing control signals corresponding to the so-furnished function signals, storage means having first storage locations for storing data required for computing the fare based on distance travelled and waiting time, second storage locations for storing the so-computed fare and third storage locations for storing data representing additional charges, computer means operative under control of said control signals for carrying out computations on data supplied thereto, and indicator means having a plurality of indicator positions each connected to a corresponding one of said storage locations in said storage means under control of said control signals, for furnishing a visual indication of the data stored in said corresponding ones of said storage locations, the improvement, comprising, in combination, switch means in said input means for furnishing a total tariff signal upon external activation; and control circuit means in said control means for furnishing control signals in response to said total tariff signal, for supplying data stored in said second and third storage locations to said computer means, controlling said computer means to add said data stored in said third storage locations to said data stored in said second storage locations and furnish a corresponding sum signal, and for transferring said sum signal to said corresponding ones of said storage locations connectable to said indicator locations, whereby visual indication of said sum signal is furnished under control of said control signals.

2. A taximeter as set forth in claim 1, wherein said taximeter has a key operable by the driver at the end of the trip for terminating the fare computation on the basis of waiting time; and wherein said switch means in said input means is said key.

3. A taximeter as set forth in claim 1, wherein said corresponding ones of said storage locations in said storage means are said third storage locations; wherein said switch means in said input means further comprise means for furnishing a subtract signal; and wherein said control circuit means comprise bistable circuit means having a first state in response to said tariff signal, for controlling said computer means to add said fare stored in said second storage locations to said data stored in said third storage locations and a second stable state in response to said subtract signal for causing said computer means to subtract said data stored in said second storage locations from said data stored in said third storage locations.

4. A taximeter as set forth in claim 3, wherein said switch means comprise a first and second key, and means connecting said first and second key to said bistable circuit means in such a manner that operation of said first key switches said bistable circuit means to said first stable state and operation of said second key switches said bistable circuit means to said second stable state.

5. A taximeter as set forth in claim 3, wherein said switch means comprise a single key, and means for connecting said key to said bistable circuit means in such a manner that depression of said key switches said bistable circuit means to said first stable state and release of said key switches said bistable circuit means to said second stable state.

* * * * *